US012794636B2

(12) United States Patent
Ferdinand et al.

(10) Patent No.: US 12,794,636 B2
(45) Date of Patent: Nov. 10, 2026

(54) PULSE SHAPED AND OVERLAPPED REFERENCE SIGNALS

(71) Applicant: Huawei Technologies Co., Ltd., Shenzhen (CN)

(72) Inventors: Nuwan Suresh Ferdinand, Kanata (CA); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 18/820,814

(22) Filed: Aug. 30, 2024

(65) Prior Publication Data

US 2025/0055637 A1 Feb. 13, 2025

Related U.S. Application Data

(63) Continuation of application No. PCT/CN2022/078717, filed on Mar. 2, 2022.

(51) Int. Cl.

*H04L 5/00* (2006.01)
*H04J 13/18* (2011.01)
*H04L 27/26* (2006.01)
*H04W 72/21* (2023.01)

(52) U.S. Cl.

CPC ............ *H04L 5/0051* (2013.01); *H04J 13/18* (2013.01); *H04L 27/2607* (2013.01); *H04L 27/2613* (2013.01); *H04W 72/21* (2023.01)

(58) Field of Classification Search

None

See application file for complete search history.

(56) References Cited

U.S. PATENT DOCUMENTS

| | | | |
|---|---|---|---|
| 2013/0114514 A1 | 5/2013 | Nissila | |
| 2016/0119021 A1 | 4/2016 | Sorrentino | |
| 2018/0115446 A1* | 4/2018 | Adhikary | H04L 25/0226 |
| 2020/0187302 A1* | 6/2020 | Si | H04L 5/10 |
| 2020/0235878 A1* | 7/2020 | Yang | H04W 72/12 |
| 2021/0044981 A1* | 2/2021 | Bhattad | H04J 13/0003 |

(Continued)

FOREIGN PATENT DOCUMENTS

| | | |
|---|---|---|
| CN | 101766008 A | 6/2010 |
| CN | 112260810 A | 1/2021 |

(Continued)

OTHER PUBLICATIONS

"3rd Generation Partnership Project; Technical Specification Group Radio Access Network; NR; Physical channels and modulation (Release 15)," 3GPP TS 38.211 V15.6.0, Technical Specification, (Jun. 2019), 97 pages.

*Primary Examiner* — Jutai Kao
(74) *Attorney, Agent, or Firm* — Slater Matsil, LLP

(57) ABSTRACT

Methods and apparatus related to pulse shaped and overlapped reference signals are disclosed. Signaling that indicates information associated with a length of a base sequence and a length of a cyclic rotation is communicated between a first communication device and a second communication device in a wireless communication network. A DMRS is also communicated in the wireless communication network. The DMRS comprises a DMRS sequence of a target length, and the DMRS sequence comprises the base sequence cyclically rotated by the length of the cyclic rotation. Cyclic extension is also applied a base sequence in some embodiments.

20 Claims, 14 Drawing Sheets

(56) References Cited

U.S. PATENT DOCUMENTS

| | | | | |
|---|---|---|---|---|
| 2021/0315033 | A1* | 10/2021 | Zhao | H04W 24/10 |
| 2022/0123885 | A1* | 4/2022 | Shin | H04L 5/0048 |

FOREIGN PATENT DOCUMENTS

| | | | |
|---|---|---|---|
| CN | 112468991 | A | 3/2021 |
| CN | 113783817 | A | 12/2021 |
| WO | 2020076656 | A1 | 4/2020 |

* cited by examiner

PULSE SHAPED AND OVERLAPPED REFERENCE SIGNALS

CROSS-REFERENCE TO RELATED APPLICATIONS

This application is a continuation of International Application No. PCT/CN2022/078717, filed on Mar. 2, 2022, the disclosure of which is hereby incorporated by reference in its entirety.

TECHNICAL FIELD

The present application relates to wireless communications generally, and more specifically to reference signals for use in wireless communications systems.

BACKGROUND

In some wireless communication systems, user equipments (UEs) wirelessly communicate with one or more network devices such as base stations, and potentially with each other. A wireless communication from a UE to a network device is referred to as an uplink communication. A wireless communication from a network device to a UE is referred to as a downlink communication. A direct wireless communication between UEs is referred to as a device-to-device communication or a sidelink communication. Network devices may also wirelessly communicate with each other over a backhaul link.

When wireless communication occurs between two communication devices, the communication device that is transmitting a signal may be referred to as a transmitting device, and the communication device that is receiving a signal may be referred to as a receiving device. A single communication device might be both a transmitting device and a receiving device, if that communication device performs both transmission and reception. Examples of communication devices include UEs and network devices. During uplink communication, for example, a UE is the transmitting device and a network device is the receiving device. During downlink communication, the UE is the receiving device and the network device is the transmitting device. One UE is the transmitting device and another UE is the receiving device during sidelink communication, and one network device is the transmitting device and another network device is the receiving device during backhaul communication between the network devices over a backhaul link.

A reference sequence may be transmitted over a wireless channel from a transmitting device to a receiving device. The reference sequence may be used by the receiving device to perform channel estimation for the wireless channel over which the reference sequence was received. Results of the channel estimation may then be used by the receiving device for decoding information, such as control information and/or data, that is received from the transmitting device on that wireless channel.

Pulse shaping may be used together with bandwidth expansion in waveforms to reduce peak to average power ratio (PAPR). For example, pulse shaping and bandwidth expansion may be used in single carrier-offset quadrature amplitude modulation (SC-OQAM) or frequency domain spectral shaping with discrete Fourier transform-spread orthogonal frequency division multiplexing (FDSS-DFT-s-OFDM). Typically, pulse shaping is performed in the frequency domain, and a reduction of PAPR is achieved via bandwidth expansion and pulse shaping. This creates a tradeoff between PAPR and spectral efficiency. For example, larger bandwidth expansion, together with larger roll off factor of pulse shape, results in lower PAPR but reduces spectral efficiency.

This loss of spectral efficiency can be recovered by bandwidth-overlapping UEs. A proper overlapping factor and pulse shaping guarantees orthogonality between UEs in flat fading channels. Although exact orthogonality is lost in frequency selective channels, performance can still be improved significantly by multiplexing UEs with overlapped bandwidth.

A reference signal such as a demodulation reference signal (DMRS) may be designed for use in performing channel estimation. There are techniques to design DMRS for non-overlapped transmission, but DMRS design for overlapped transmission is non-trivial. In overlapped transmission, DMRS design is not straightforward, at least because two UEs have unmatched pulse coefficients. One possible solution is to use frequency domain multiplexing where UEs are allocated alternative subcarriers for DMRS, thereby making them orthogonal in frequency domain. However, this approach loses half of the spectral efficiency of DMRS in comparison to code domain multiplexing (CDM) approaches where each subcarrier is used by both UEs.

Finding a reference signal approach that preserves or improves spectral efficiency and channel estimation performance for overlapped reference signal transmission, by enabling CDM in such scenarios for example, remains a challenge.

SUMMARY

In some embodiments, a common base sequence is used for all UEs. That base sequence is rotated so that, for a given subcarrier, overlapped UEs have the same DMRS. The base sequence may also be cyclically extended. Cyclic rotation and extension allow for CDM to be applied, and can provide good channel estimation performance.

According to an aspect of the present disclosure, a method is performed by a first communication device in a wireless communication network, and involves communicating signaling with a second communication device in the wireless communication network. The signaling indicates information that is associated with a length of a base sequence and a length of a cyclic rotation. Such a method may also involve communicating a DMRS in the wireless communication network. The DMRS comprises a DMRS sequence of a target length, and the DMRS sequence comprises the base sequence cyclically rotated by the length of the cyclic rotation.

An apparatus according to another aspect of the present disclosure includes a processor and a non-transitory computer readable storage medium that is coupled to the processor. The non-transitory computer readable storage medium stores programming for execution by the processor. The programming includes instructions to, or to cause the processor to, communicate signaling by a first communication device with a second communication device in a wireless communication network. The signaling indicates information associated with a length of a base sequence and a length of a cyclic rotation. The programming may also include instructions to, or to cause the processor to, communicate, by the first communication device, a DMRS in the wireless communication network. The DMRS comprises a DMRS sequence of a target length, and the DMRS sequence comprises the base sequence cyclically rotated by the length of the cyclic rotation.

A computer program product includes a non-transitory computer readable medium storing programming, and the programming includes instructions to, or to cause the processor to, communicate signaling by a first communication device with a second communication device in a wireless communication network, and to communicate, by the first communication device, a DMRS in the wireless communication network. The signaling indicates information associated with a length of a base sequence and a length of a cyclic rotation, the DMRS comprises a DMRS sequence of a target length, and the DMRS sequence comprises the base sequence cyclically rotated by the length of the cyclic rotation.

The present disclosure encompasses these and other aspects or embodiments.

BRIEF DESCRIPTION OF THE DRAWINGS

For a more complete understanding of the present embodiments, and the advantages thereof, reference is now made, by way of example, to the following descriptions taken in conjunction with the accompanying drawings.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 1:
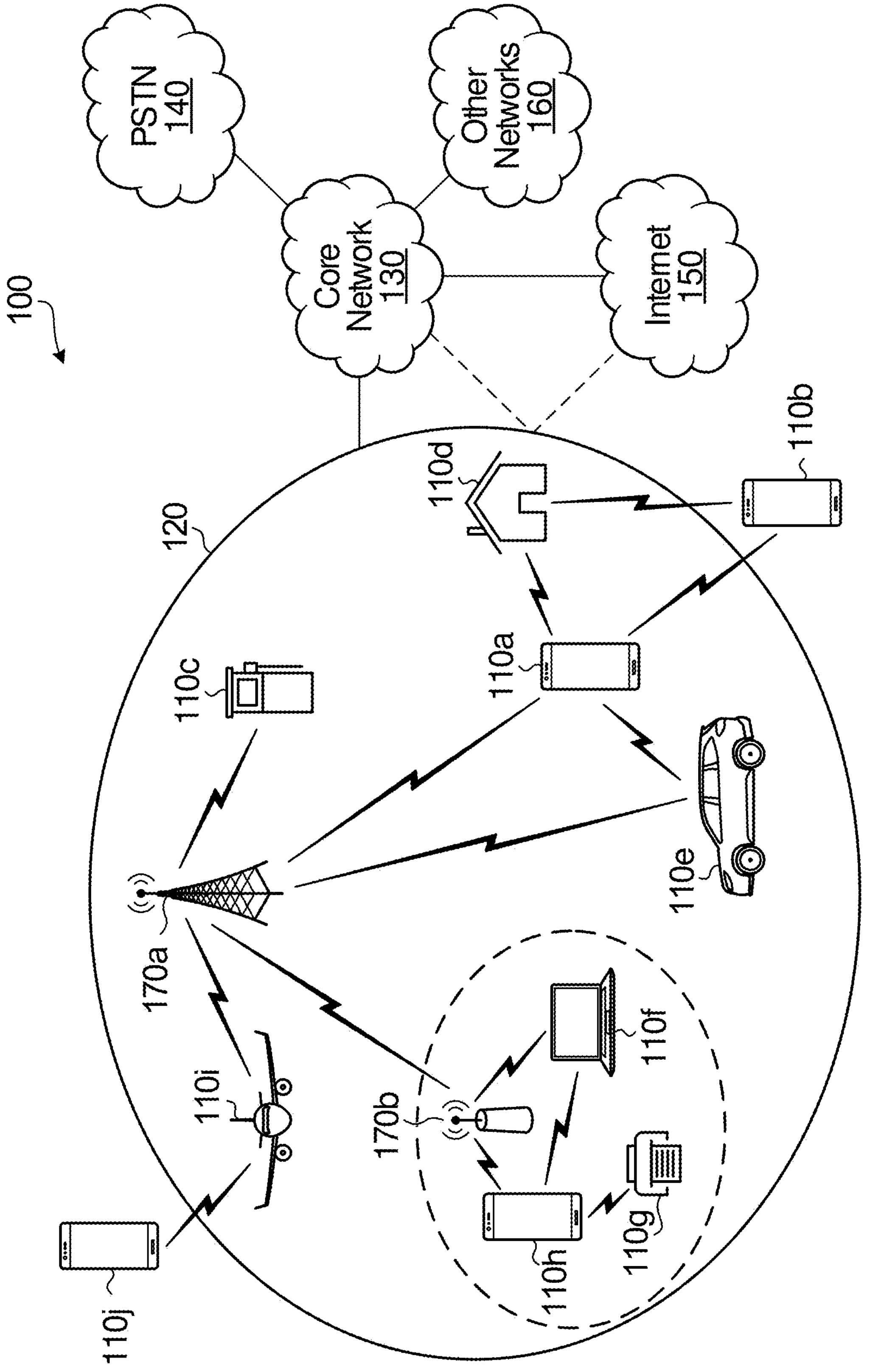
FIG. 1 is a simplified schematic illustration of a communication system.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
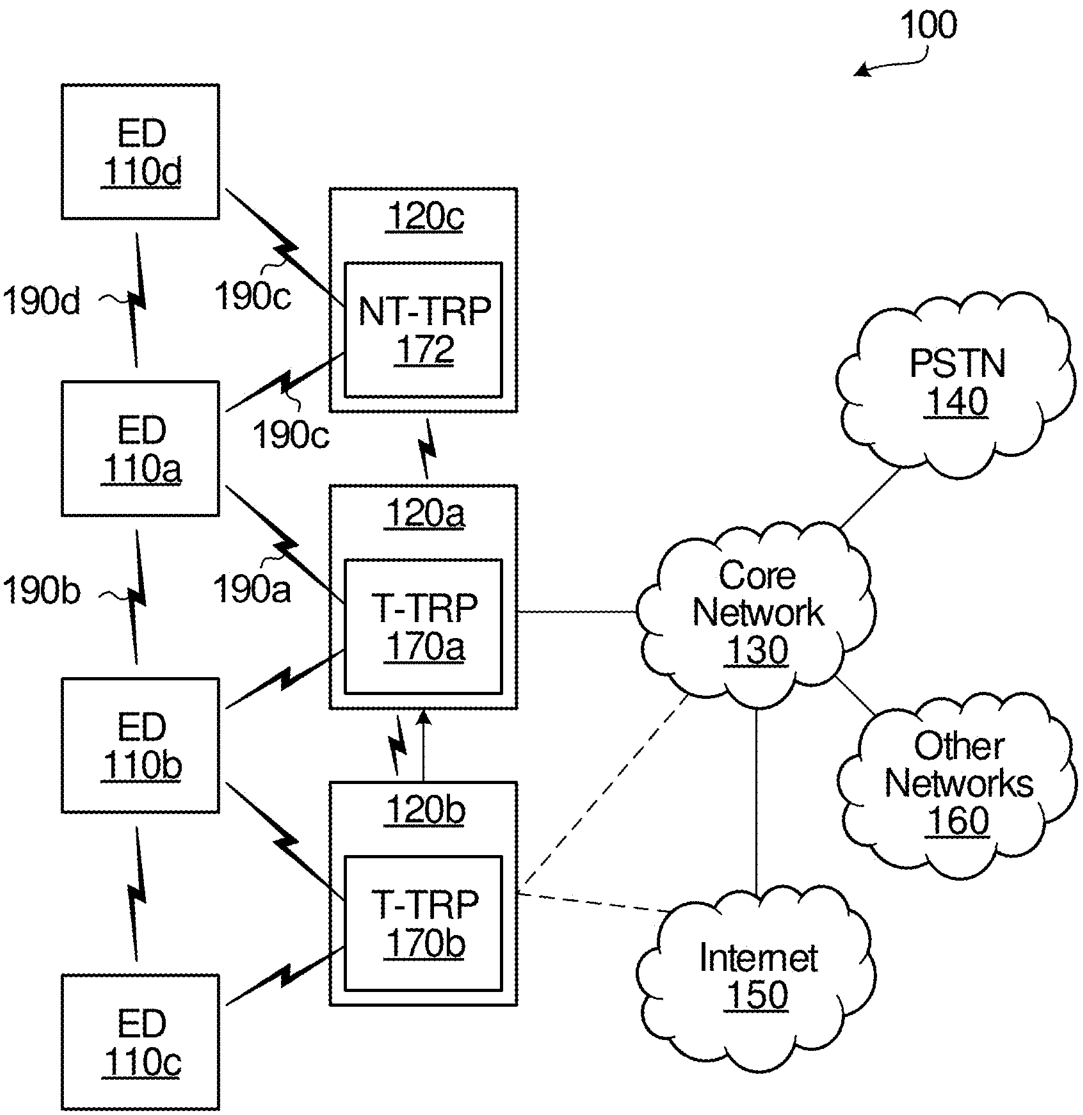
FIG. 2 is a block diagram illustration of the example communication system in FIG. 1.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over an non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
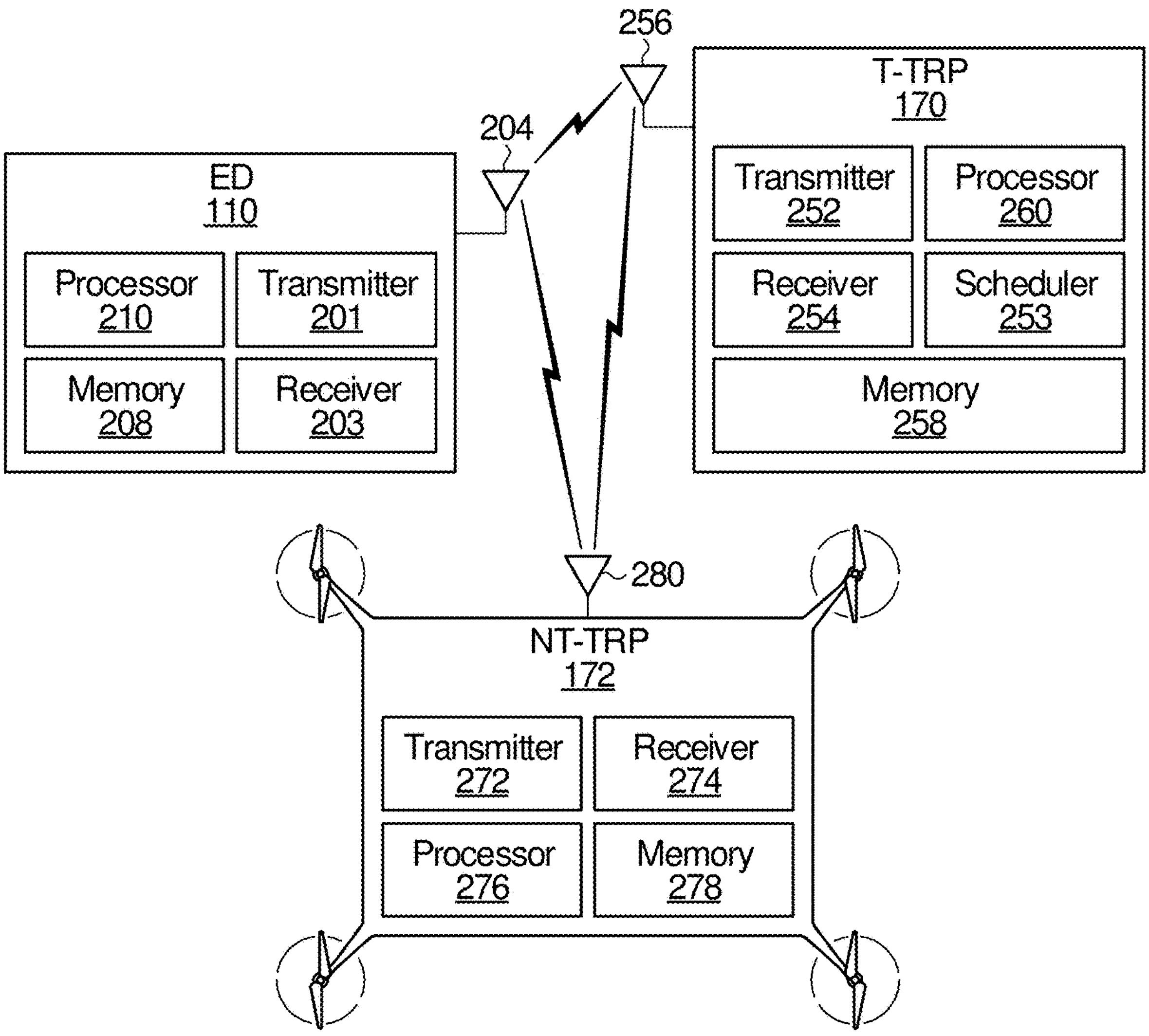
FIG. 3 illustrates an example electronic device and examples of base stations.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED

110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

The T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output (MIMO) precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
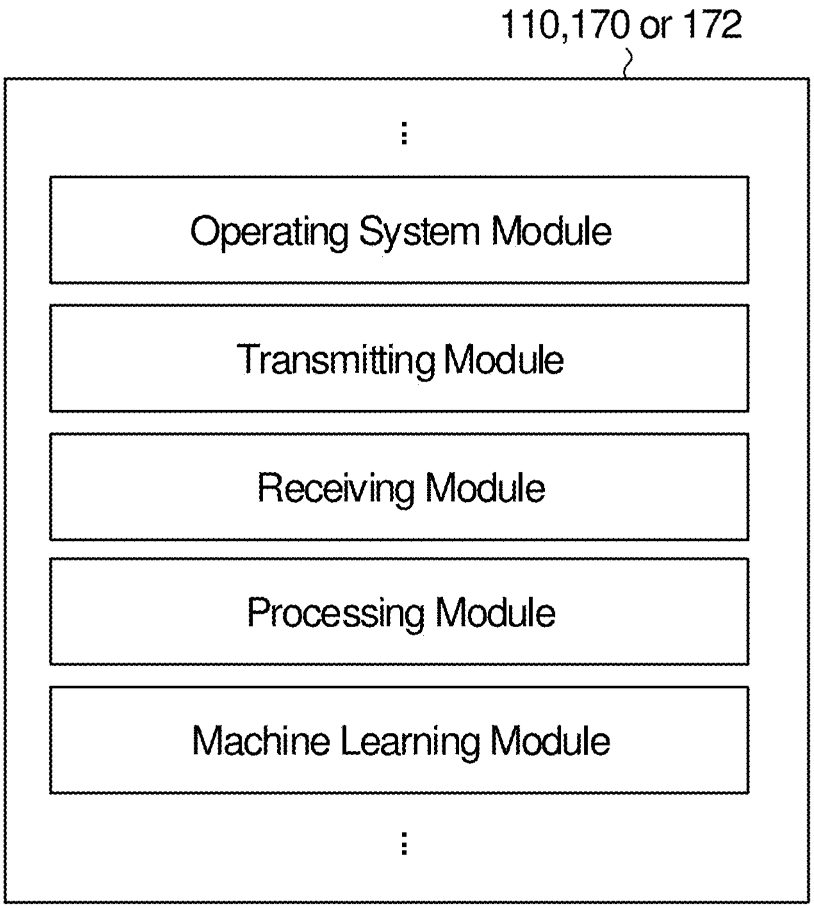
FIG. 4 illustrates units or modules in a device.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

Embodiments disclosed herein relate primarily to reference signal generation, with DMRS as an illustrative example, for overlapped UEs. DMRS generation by each UE involves a length M root or base sequence. Cyclic rotation of the base sequence, and cyclic extension of the base sequence in some embodiments, may be useful to enable CDM to be applied and help maintain good spectral efficiency and channel estimation performance for overlapped UEs.

Figure 5:
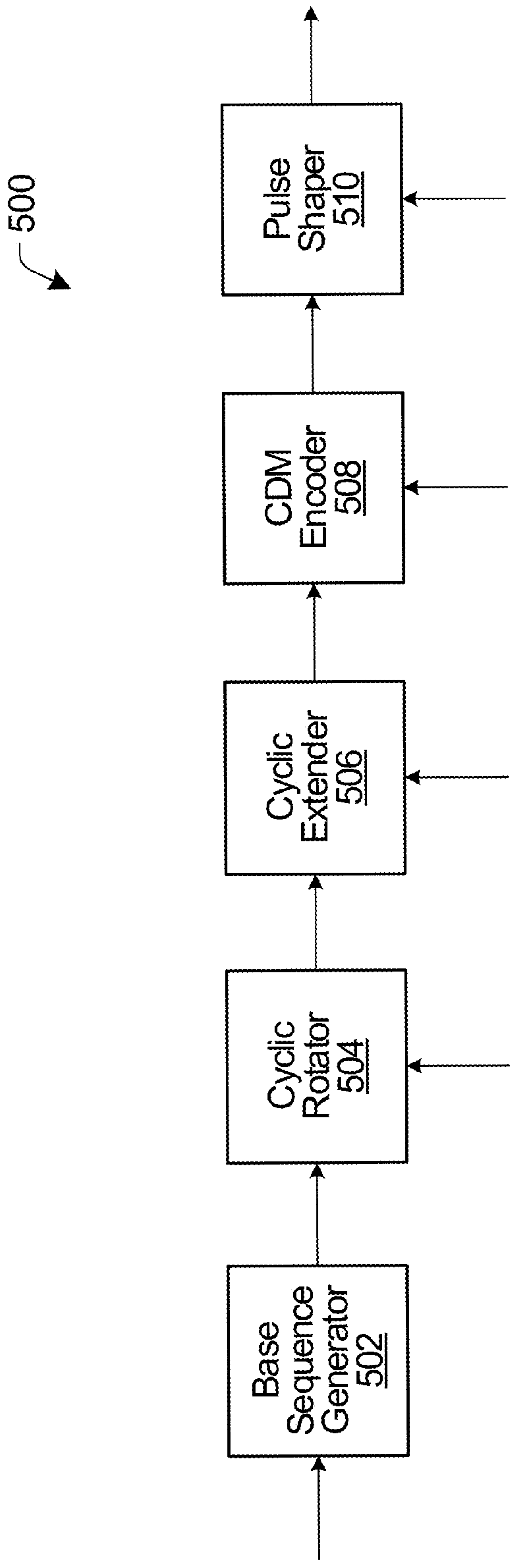
FIG. 5 is a block diagram illustrating an example DMRS generator according to an embodiment.

FIG. 5 is a block diagram illustrating an example DMRS generator according to an embodiment. The example DMRS generator 500 includes a base sequence generator 502, a cyclic rotator 504, a cyclic extender 506, a CDM encoder 508, and a pulse shaper 510, interconnected as shown. Other embodiments may include additional, fewer, or different elements interconnected in a similar or different way. As an example, cyclic rotation may be performed before or after cyclic extension, and therefore the cyclic rotator 504 and the cyclic extender 506 may be coupled together as shown, or with the cyclic extender 506 coupled to the base sequence generator 502 and the cyclic rotator 504 coupled to the cyclic extender. Other variations are also possible.

The elements shown in FIG. 5 may be implemented in any of various ways, such as in hardware, firmware, or one or more components that execute software. The present disclosure is not limited to any specific type of implementation, and implementation details may vary between different devices, for example.

The base sequence generator 502 is configured, by executing software for example, to generate a base sequence. The cyclic rotator 504 is configured, by executing software for example, to apply cyclic rotation to the base sequence that is generated by the base sequence generator 502 in the example shown. The sequence is then extended, by the cyclic extender 506, which is configured to extend a sequence, again by executing software for example.

CDM may be applied before pulse shaping during DMRS generation, or at the same time as pulse shaping in some embodiments. A CDM procedure may be performed using an orthogonal cover code (OCC) for precoding, and then multiplexing antenna ports or UEs in the same resources. The CDM encoder 508 is configured, by executing software for example, to apply CDM to a sequence, and this may involve precoding the sequence in a CDM procedure.

The pulse shaper 510 is configured, by executing software for example, to apply pulse shaping to the DMRS sequence.

The example shown in FIG. 5 is for a general case of a $u^{th}$ UE, which is to generate a DMRS signal or sequence of length $N_u$. In order to generate a length $N_u$ DMRS sequence, in the example shown a length M base sequence is first generated by the base sequence generator 502, then cyclically rotated by $L_u$ by the cyclic rotator 504 and cyclically extended to a length $N_u$ sequence by the cyclic extender 506. Finally, CDM is performed by the CDM encoder 508 and pulse shaping is applied by the pulse shaper 510 to obtain the desired DMRS sequence $v_u$.

DMRS generation as shown in FIG. 5 involves several parameters, including M, $L_u$, and $N_u$. These parameters are signaled from a network device such as a base station in some embodiments. More generally, a transmitter receives or otherwise obtains parameters or to enable DMRS generation.

As an example, let the length M base sequence be:

$$r(m),\ \forall\, m \in \{0,\ 1,\ \ldots\ M-1\},$$

with r being an output of the base sequence generator 502 in the example DMRS generator in FIG. 5. Embodiments are not restricted to any particular type of base sequence. A base sequence may be or include, for example, a Zadoff-Chu (ZC) sequence, a pseudo noise (PN) sequence, or a processor-generated or computer-generated base sequence, for example.

This length M base sequence is cyclically rotated by $L_u$:

$$\overline{r}_u(m) = r((m-L_u) \bmod M),\ \ \forall\, m \in \{0, 1, \ldots M-1\},$$

and this cyclically rotated sequence is also shown by way of example in FIG. 5, as an output of the cyclic rotator 504.

This sequence, also of length M, is cyclically extended to length $N_u$:

$$\tilde{r}_u(n) = \overline{r}_u((n) \bmod M),\ \ \forall\, n \in \{0, 1, \ldots, N_u-1\},$$

and this sequence is shown in FIG. 5 as well, as an output of the cyclic extender 506.

CDM precoding is performed on this sequence:

$$x_u(n) = \phi_u(n)\tilde{r}_u(n),\ \ \forall\, n \in \{0, 1, \ldots, N_u-1\},$$

with a CDM precoder $\phi_u(n)$ that may be based on an OCC for example.

Different UEs use different precoders, and as an example a first UE may use a precoder $\phi_u(n)=1\forall n$, while a second UE uses:

$$\phi_u(n) = \begin{cases} 1, & n \text{ is odd} \\ -1, & n \text{ is even} \end{cases}.$$

The last operation involved in DMRS generation in FIG. 5 is pulse shaping to obtain a final DMRS sequence:

$$v_u(n) = f_u(n)x_u(n),\ \ \forall\, n \in \{0, 1, \ldots, N_u-1\},$$

where $f_u$ represents pulse shaping coefficients.

Figure 6:
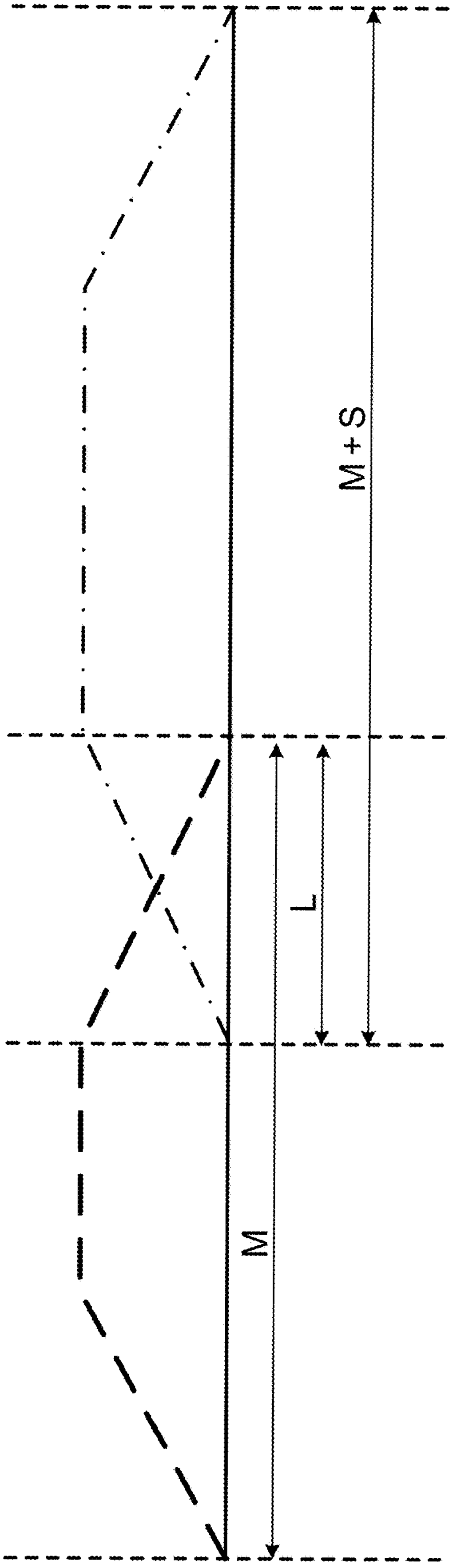
FIG. 6 includes frequency domain plots illustrating an example of DMRS design for overlapping UEs according to an embodiment.

FIG. 6 includes frequency domain plots illustrating an example of DMRS design for overlapping UEs according to an embodiment.

The example shown in FIG. 6 is based on two overlapping UEs being allocated $N_1$=M subcarriers and $N_2$=M+S subcarriers. The number of overlapping subcarriers of the two UEs is L. S is greater than or equal to 0, and L is less than or equal to M.

Let the DMRS sequence of the UE with M subcarriers be:

$$x_1(m) = x(m),\ \ \forall\, m \in \{0, 1, \ldots M-1\},$$

and define the following length M+S DMRS from a cyclically extended length M sequence of x(0), x(1), . . . , x(M−1):

$$x_2(m) = x([m-L] \bmod M),\ \ \forall\, m \in \{0, 1, \ldots, M+S-1\}.$$

Thus, each UE generates the same length M base sequence, and one or more UEs apply cyclic rotation and cyclic extension to the base sequence.

In the two-UE example in FIG. 6, both of the UEs generate a length M sequence. The length M base sequence, the cyclically rotated sequence, and the cyclically rotated and extended sequence include the same values in the overlapping subcarrier region indicated by the L subcarriers in FIG. 6. Although non-zero cyclic rotation and extension are applied by only one UE in some embodiments, both UEs may be configured to cyclically rotate and extend sequences during DMRS generation. For example, both UEs may include a DMRS generator as shown in FIG. 5, but one may receive signaling or otherwise be configured with a zero value for $L_u$ and M=$N_u$ and the other may receive signaling or otherwise be configured with a non-zero value for Ly and either M=$N_u$ (no cyclic extension) or M≠$N_u$ (non-zero cyclic extension).

Figure 7:
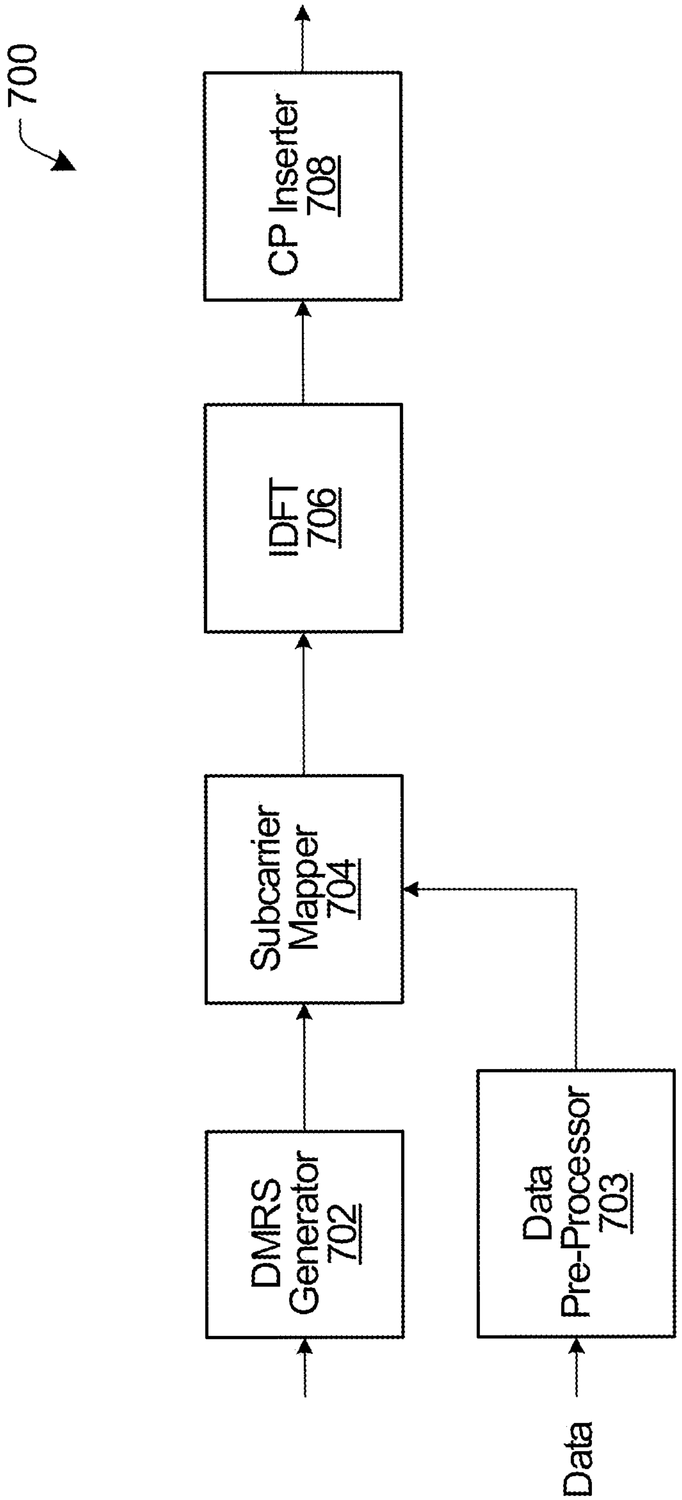
FIG. 7 is a block diagram illustrating an example transmitter.

FIG. 7 is a block diagram illustrating an example transmitter 700. The example transmitter 700 includes a DMRS generator 702, a data pre-processor 703, a subcarrier mapper 704, an inverse discrete Fourier transform (IDFT) block 706, and a cyclic prefix (CP) inserter 708, interconnected as shown. Other embodiments may include additional, fewer, or different elements interconnected in a similar or different way.

The elements shown in FIG. 7 may be implemented in any of various ways, such as in hardware, firmware, or one or more components that execute software. As noted elsewhere herein, the present disclosure is not limited to any specific type of implementation, and implementation details may vary between different devices, for example.

The DMRS generator 702 is configured, by executing software for example, to generate a DMRS. An example of a DMRS generator is shown in FIG. 5. The data pre-processor 703 is configured, by executing software for example, to process data based on the waveform that is to be used to transmit the data. The subcarrier mapper 704 is configured, by executing software for example, to map the DMRS to subcarriers. A transmitter may include a multiplexer (not shown) to multiplex a DMRS with data after precoding and before subcarrier mapping, for example. The IDFT block 706 is configured, by executing software for example, to create a time domain signal by converting from frequency domain to time domain, and in particular by taking an IDFT in the example transmitter 700. The CP inserter 708 is configured, by executing software for example, to insert a CP prior to transmission.

Pre-processed data and DMRS may be simultaneously mapped to subcarriers. In this case, both data and DMRS signal are multiplexed in a symbol. In another embodiment, data and DMRS are not multiplexed together. In this case, one or more symbols may contain DMRS and one or more other symbols may contain data. In these two cases, a "symbol" is referring to the output of the CP inserter 708.

Figure 8:
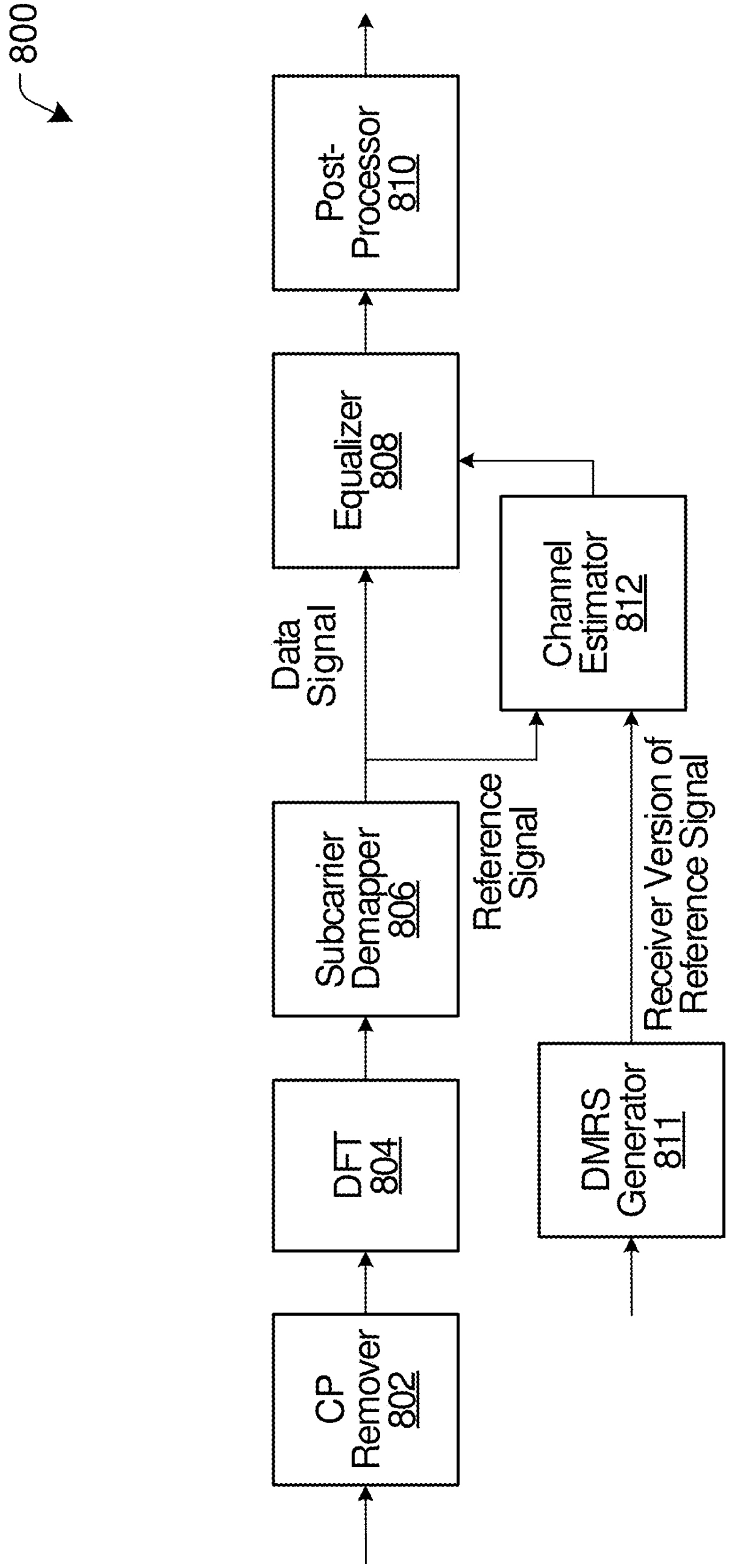
FIG. 8 is a block diagram illustrating an example receiver.

FIG. 8 is a block diagram illustrating an example receiver. The example receiver 800 includes a CP remover 802, a DFT block 804, a subcarrier demapper 806, an equalizer 808, a post-processor 810, a DMRS generator 811, and a channel estimator 812, interconnected as shown. Other embodiments may include additional, fewer, or different elements interconnected in a similar or different way.

The elements shown in FIG. 8 may be implemented in any of various ways, such as in hardware, firmware, or one or more components that execute software. As noted elsewhere herein, the present disclosure is not limited to any specific type of implementation, and implementation details may vary between different devices, for example.

Receiver operations may include CP removal, conversion to frequency domain by a DFT, subcarrier demapping and demultiplexing a data signal and a reference signal, channel estimation based on a received reference signal and a locally generated receiver version of the reference signal, equalization of the data signal based on channel estimates, and any of various types of post-processing, such as further processing based on transmitter precoding for example.

In the example receiver 800, the CP remover 802 is configured, by executing software for example, to remove the cyclic prefix; the DFT block 804 is configured, by executing software for example, to perform a DFT to convert a received time domain signal to frequency domain; the subcarrier demapper 806 is configured, by executing software for example, to perform subcarrier demapping; the equalizer 808 is configured, by executing software for example, to equalize a data portion of the output of the subcarrier demapper 806; the channel estimator 812 is configured, by executing software for example, to process a reference signal portion of the output of the subcarrier demapper 806 and a receiver version of the reference signal generated by the DMRS generator 811 to produce channel estimates that are provided to the equalizer 808; and the post-processor 810 is configured, by executing software for example, to process the output of the equalizer. The channel estimator 812 receives a receiver version of the reference signal from the DMRS generator 811 for channel estimation in the example receiver 800. More generally, the channel estimator 812 receives, determines, or otherwise obtains the same base sequence or DMRS as a transmitter and then uses it to perform channel estimation. The post-processor 810 may take into account any precoding performed at a transmitter, for example.

Either of two types of receivers may be used in embodiments. One type of receiver is a non-transparent receiver. In the case of a non-transparent receiver, the receiver has knowledge of pulse shaping used at the transmitter, and uses the DMRS signal to estimate the channel.

According to an embodiment, channel estimation is performed jointly (in the overlap part) between overlapping UEs, and adjacent subcarriers are used to jointly estimate channels of two UEs. Let the channel of a first UE be $h_1$ and the channel of a second UE be $h_2$ for two adjacent subcarriers, and let the CDM precoder $\phi_u(n)$ use an OCC such that the first UE uses $\phi_u(n)=1\ \forall n$, and the second UE uses:

$$\phi_u(n)=\begin{cases}1, & n \text{ is odd}\\ -1, & n \text{ is even}\end{cases}$$

consistent with an example that was also provided above.

Figure 9:
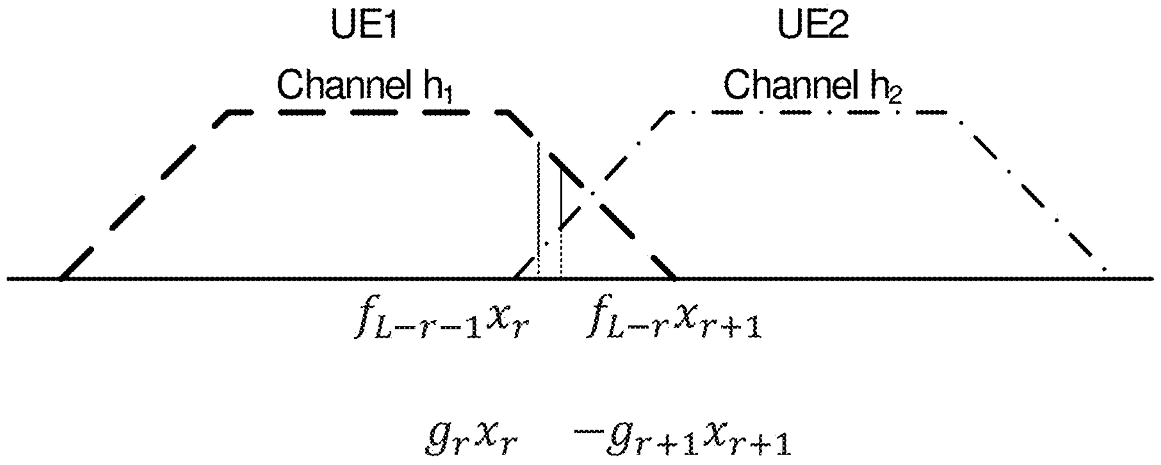
FIG. 9 includes frequency domain plots illustrating received overlapped DMRS for two UEs.

FIG. 9 includes frequency domain plots illustrating received overlapped DMRS for two UEs. Based on the properties outlined above, for the adjacent two subcarriers, illustrated in FIG. 9 the received signal is given by:

$$y_r = h_1 f_{L-r-1} x_r + h_2 g_r x_r + n_r$$

$$y_{r+1} = h_1 f_{L-r} x_{r+1} - h_2 g_{r+1} x_{r+1} + n_{r+1}$$

which can be represented in matrix form as:

$$\begin{bmatrix} y_r/x_r \\ y_{r+1}/x_{r+1} \end{bmatrix} = \begin{bmatrix} f_{L-r-1} & g_r \\ f_{L-r} & -g_{r+1} \end{bmatrix}\begin{bmatrix} h_1 \\ h_2 \end{bmatrix} + \begin{bmatrix} \overline{n}_r \\ \overline{n}_{r+1} \end{bmatrix},$$

where n represents noise, and f and g represent pulse shaping coefficients for pulse shaping that is applied by UE1 and UE2, respectively.

Estimated channels, again in matrix form, are:

$$\begin{bmatrix} \tilde{h}_1 \\ \tilde{h}_2 \end{bmatrix} = W\begin{bmatrix} y_r/x_r \\ y_{r+1}/x_{r+1} \end{bmatrix}$$

Where:

$$W = \left(\begin{bmatrix} f_{L-r-1} & g_r \\ f_{L-r} & -g_{r+1} \end{bmatrix}^T \begin{bmatrix} f_{L-r-1} & g_r \\ f_{L-r} & -g_{r+1} \end{bmatrix}\right)^{-1} \begin{bmatrix} f_{L-r-1} & g_r \\ f_{L-r} & -g_{r+1} \end{bmatrix}^T.$$

Figure 10:
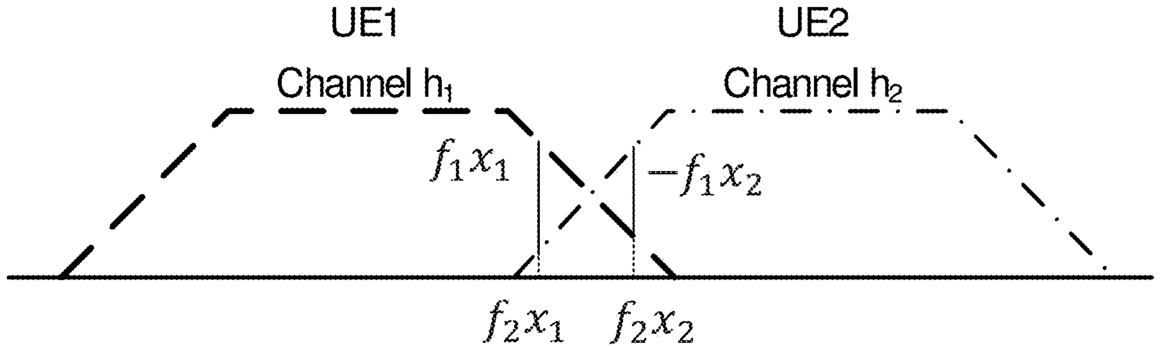
FIG. 10 includes frequency domain plots illustrating received overlapped DMRS for two UEs and a flat fading channel.

In another embodiment that may perform well in frequency flat fading channels and when both UEs use the same pulse shaping, a channel may stay the same within the overlap part of the spectrum. FIG. 10 includes frequency domain plots illustrating received overlapped DMRS for two UEs and a flat fading channel.

Due to symmetry of the two UEs in this example, they have the same pulse shape coefficient in two locations as shown in FIG. 10. Receiver processing may then be based on an assumption that the channels $h_1$ and $h_2$ remain same for these two subcarriers. The two received signals in these two subcarriers may be expressed as follows:

$$y_r = h_1 f_r x_r + h_2 f_s x_r + n_r$$

$$y_s = h_1 f_s x_2 - h_2 f_r x_2 + n_s$$

and in matrix form as:

$$\begin{bmatrix} y_r/x_r \\ y_s/x_s \end{bmatrix} = \begin{bmatrix} f_r & f_s \\ f_s & -f_r \end{bmatrix} \begin{bmatrix} h_1 \\ h_2 \end{bmatrix} + \begin{bmatrix} \overline{n}_r \\ \overline{n}_s \end{bmatrix}.$$

If the pulse shape is Nyquist, then $$\begin{bmatrix} f_1 & f_2 \\ f_2 & -f_1 \end{bmatrix}$$

is a unitary matrix and therefore $h_1$ and $h_2$ can be recovered as:

$$\begin{bmatrix} \tilde{h}_1 \\ \tilde{h}_2 \end{bmatrix} = W \begin{bmatrix} y_r/x_r \\ y_s/x_s \end{bmatrix}$$

where $$W = \begin{bmatrix} f_1 & f_2 \\ f_2 & -f_1 \end{bmatrix}^T.$$

These examples relate to channel estimation in a non-transparent receiver. Embodiments for a transparent receiver are also possible. In the case of a transparent receiver, the receiver has no knowledge of pulse shaping used at the transmitter, and uses a DMRS signal to estimate the both pulse and the channel.

Channel estimation is performed jointly (in the overlap part) between overlapping UEs, and adjacent subcarriers are used to jointly estimate the channels of two UEs. As in the examples above, let the channels of first and second UEs be $h_1$ and $h_2$, respectively, for those two subcarriers and let the CDM precoder $\phi_u(n)$ use an OCC such that the first UE uses $\phi_u(n)=1\ \forall n$, and the second UE uses:

$$\phi_u(n) = \begin{cases} 1, & n \text{ is odd} \\ -1, & n \text{ is even} \end{cases}$$

Based on these properties, the received DMRS signal is as shown in FIG. 9, and the received signals are as in the first non-transparent receiver example above:

$$y_r = h_1 f_r x_r + h_2 f_s x_r + n_r$$

$$y_s = h_1 f_s x_2 - h_2 f_r x_2 + n_s$$

and in matrix form:

$$\begin{bmatrix} y_r/x_r \\ y_s/x_s \end{bmatrix} = \begin{bmatrix} f_r & f_s \\ f_s & -f_r \end{bmatrix} \begin{bmatrix} h_1 \\ h_2 \end{bmatrix} + \begin{bmatrix} \overline{n}_r \\ \overline{n}_s \end{bmatrix}.$$

Let $\tilde{h}_{f1}$ be the combined channel and pulse shape for first UE for both subcarriers and $\tilde{h}_{g2}$ be the for second UE. Then:

$$\begin{bmatrix} \tilde{h}_1 \\ \tilde{h}_2 \end{bmatrix} = W \begin{bmatrix} y_r/x_r \\ y_{r+1}/x_{r+1} \end{bmatrix}$$

Where:

$$W = \frac{1}{2} \begin{bmatrix} 1 & 1 \\ 1 & -1 \end{bmatrix}^T.$$

Figure 11:
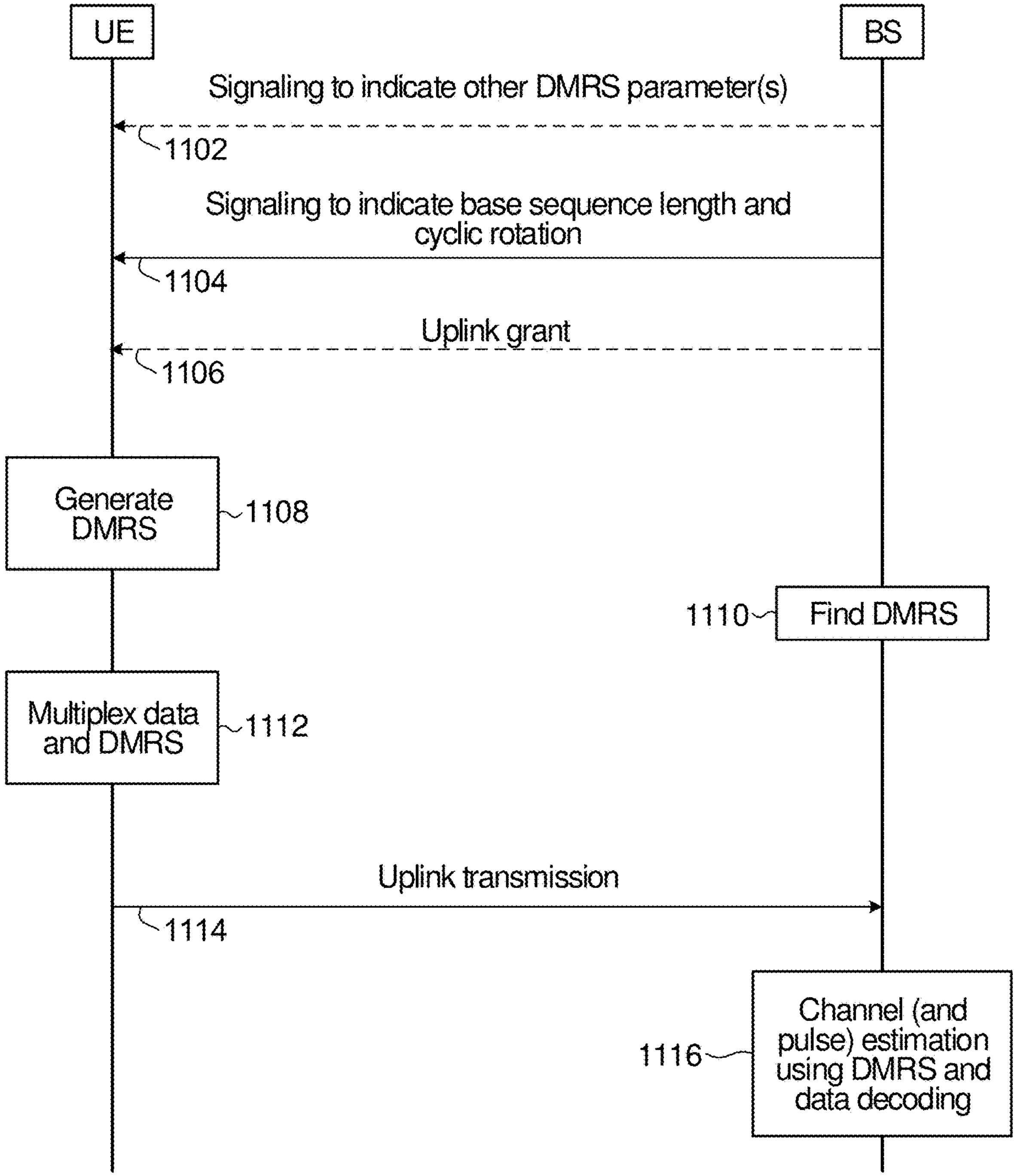
FIG. 11 is a signal flow diagram for uplink communications according to an embodiment.

FIG. 11 is a signal flow diagram for uplink communications according to an embodiment. Features illustrated in FIG. 11 include communicating signaling at 1104, which may be higher layer signaling for example, between a first communication device and a second communication device, in the form of a BS and a UE in the example shown. This communicating at 1104 involves transmitting the signaling by the BS to the UE and receiving the signaling by the UE from the BS. The signaling indicates information associated with a length of a base sequence and a length of a cyclic rotation, such as values of these length parameters. Radio resource control (RRC) signaling is one example of higher layer signaling that may be used to indicate such information. Although FIG. 11 illustrates signaling to indicate base sequence length and cyclic rotation together at 1104, base sequence length and length of cyclic rotation may be communicated in separate signaling.

Separate, optional signaling to indicate one or more other DMRS parameters is illustrated at 1102. Other DMRS parameters that may be communicated in separate signaling, or in the same signaling as base sequence length and/or cyclic rotation length in other embodiments, may include, for example, one or more of: bandwidth, target length of a DMRS sequence, a bandwidth expansion factor, and information associated with pulse shaping. Pulse shaping information may include pulse shaping coefficients $f_u$, for example. In some embodiments, other DMRS parameters referenced at 1102 and elsewhere herein are pre-configured, selected, determined, or otherwise obtained by a communication device, such as the UE in FIG. 11, and need not be indicated in signaling.

An uplink grant is optionally communicated between the BS and the UE at 1106, by the BS transmitting grant signaling to the UE and the UE receiving the grant signaling from the BS. Not all embodiments are necessarily grant-based, and therefore an uplink grant need not necessarily be communicated at 1106.

Generating a DMRS by the UE is shown at 1108, and DMRS generation is as disclosed elsewhere herein. At 1112, FIG. 11 illustrates multiplexing data and the generated DMRS by the UE, and other transmit-side operations such as creating a symbol to be transmitted as in the example transmitter 700 (FIG. 7), may also be performed. An uplink transmission from the UE to the BS is shown at 1114, and represents one example of how a DMRS may be communicated in a wireless communication network. In this example, communicating the DMRS involves transmitting the DMRS by the UE to the BS and receiving the DMRS by the BS from the UE. The DMRS, as disclosed herein, includes or is otherwise based on or comprises a DMRS sequence of a target length, and the DMRS sequence includes the base sequence cyclically rotated by the length of the cyclic rotation. As a result of the cyclic rotation, a part of the DMRS sequence that overlaps with a DMRS sequence transmitted by another communication device, in subcarriers L in the example of two UEs shown FIG. 6, is at least partially the same as the overlapping part of the DMRS sequence that is transmitted by the other communication device.

At 1116, FIG. 11 illustrates the BS performing channel estimation using the DMRS, and decoding data based on the results of the channel estimation.

At a receiving device or receiver that receives a DMRS, such as the BS in FIG. 11, channel estimation may use a locally generated receiver version of the same DMRS sequence as the UE for channel estimation. Generating a DMRS by the BS is shown at 1110 as "Find DMRS", only to differentiate DMRS generation by a transmitting device for transmission (at 1108) from receiver DMRS generation (at 1110) for local use at a receiving device. A DMRS is generated at 1110 in the same way as at 1108, as disclosed elsewhere herein.

Figure 12:
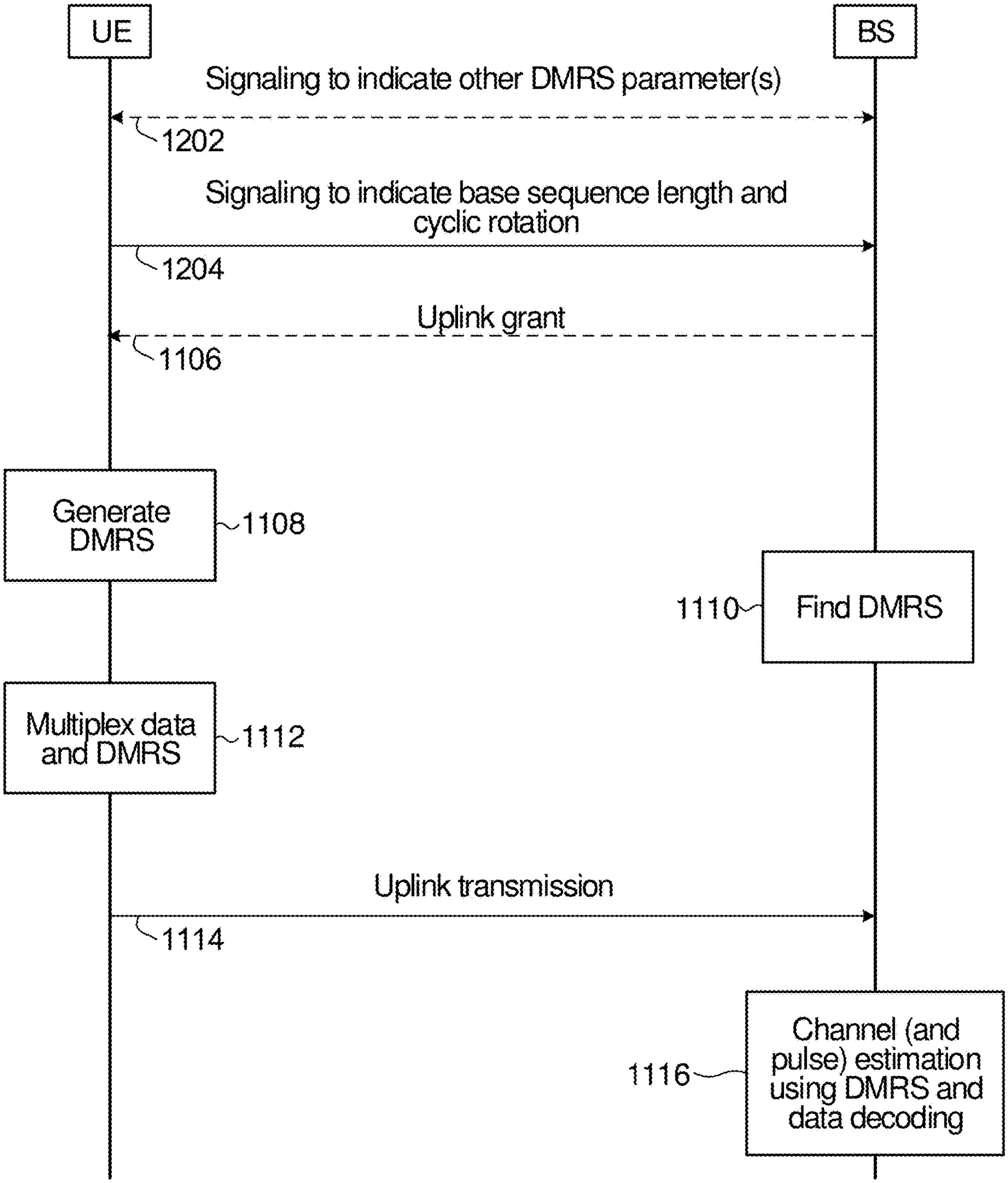
FIG. 12 is a signal flow diagram for uplink communications according to another embodiment.

FIG. 12 is a signal flow diagram for uplink communications according to another embodiment. The example in FIG. 12 is similar to the example in FIG. 11, but involves communicating signaling at 1204 by transmitting the signaling by the UE to the BS and receiving the signaling by the BS from the UE. In some embodiments, uplink communications may involve the UE selecting or otherwise obtaining base sequence length and/or a length of cyclic rotation, and possibly one or more other DMRS parameters, and transmitting signaling that indicates information related to these parameters, at 1204 and possibly 1202. The dual arrow directions at 1202 are intended to illustrate that signaling may be communicated in either direction or both directions, from the UE to the BS and/or from the BS to the UE, in some embodiments.

As an example of communicating signaling from the UE to the BS at 1204, consider an embodiment in which the UE obtains a base sequence length and a length of cyclic rotation that is to be applied to the base sequence. The UE may then transmit signaling at 1204 to indicate these parameters to the BS so that the BS can generate the same DMRS at 1110 for channel estimation at 1116. This type of embodiment may be useful, for example, when a UE selects, is configured with, or otherwise obtains DMRS parameters that are not already available to the BS.

Figure 13:
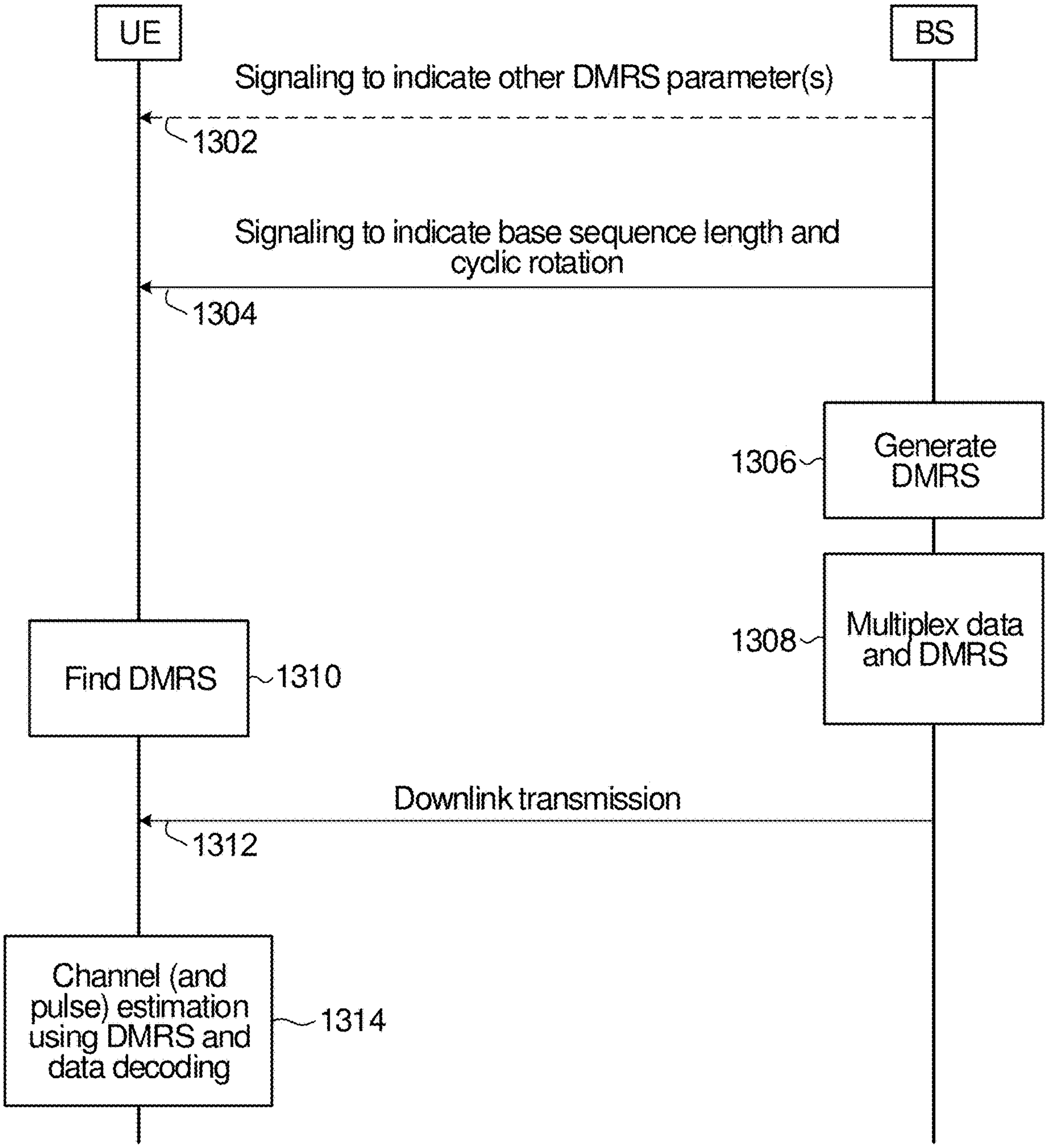
FIG. 13 is a signal flow diagram for downlink communications according to an embodiment.

FIG. 13 is a signal flow diagram for downlink communications according to an embodiment. Features illustrated in FIG. 13 include communicating signaling at 1304, and optionally at 1302, between a BS and a UE. As in FIG. 11, this communicating at 1302, 1304 involves transmitting the signaling by the BS to the UE and receiving the signaling by the UE from the BS. The signaling at 1304 indicates information associated with a length of a base sequence and a length of a cyclic rotation, and the optional signaling at 1302 indicates information associated with one or more other DMRS parameters, examples of which are provided elsewhere herein.

DMRS generation at the BS is shown at 1306. Generating a DMRS by the UE is shown at 1310 as "Find DMRS", but involves DMRS generation as disclosed elsewhere herein. As in other drawings, the labeling at 1310 is intended only to differentiate DMRS generation by a transmitting device (the BS in this example) for transmission from DMRS generation for local use at a receiving device (the UE in this example). At 1308, FIG. 13 illustrates multiplexing data and the generated DMRS by the BS, and other transmit-side operations such as creating a symbol to be transmitted as in the example transmitter 700 (FIG. 7), may also be performed. A downlink transmission from the BS to the UE is shown at 1312, and represents another example of how a DMRS may be communicated in a wireless communication network. In this example, communicating the DMRS involves transmitting the DMRS by the BS to the UE and receiving the DMRS by the UE from the BS. At 1314, FIG. 13 illustrates the UE performing channel estimation using the DMRS, and decoding data based on the results of the channel estimation.

For downlink communications, it is likely that DMRS parameters will be selected or otherwise determined by the BS. However, it is possible that DMRS parameters previously transmitted by the UE to the BS and received by the BS from the UE may be used by the BS in generating a DMRS for downlink communications. Therefore, communicating signaling that indicates DMRS parameters, including those shown by way of example at 1304 and/or other DMRS parameters, may involve communicating signaling from a UE to a BS, even in the case of downlink communications.

Figure 14:
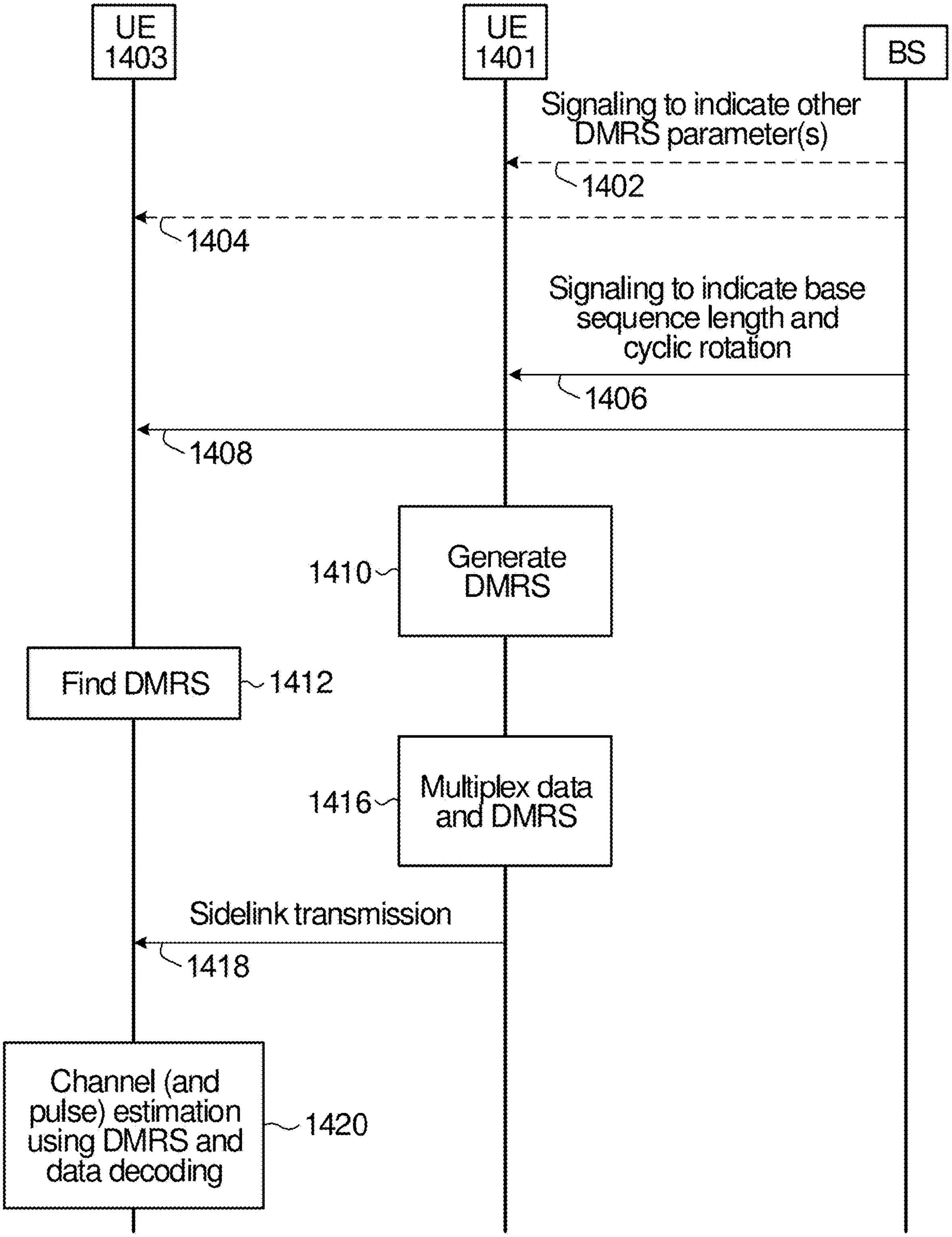
FIG. 14 is a signal flow diagram for sidelink communications according to an embodiment.

FIG. 14 is a signal flow diagram for sidelink communications according to an embodiment. Sidelink DMRS transmission may occur between two UEs that may still be controlled by a BS. Features illustrated in FIG. 14 include communicating signaling at 1406, 1408, and optionally at 1402, 1404, between a BS and a first UE, UE 1401, and between the BS and a second UE, UE 1403. The communicating at 1402, 1406 involves transmitting the signaling by the BS to UE 1401 and receiving the signaling by UE 1401 from the BS. The communicating at 1404, 1408 involves transmitting the signaling by the BS to UE 1403 and receiving the signaling by UE 1403 from the BS. The signaling at 1406, 1408 indicates information associated with a length of a base sequence and a length of a cyclic rotation. The signaling at 1402, 1404 may indicate information associated with one or more other DMRS parameters.

Generating a DMRS by UE 1401 and finding a DMRS by UE 1403 are shown at 1410, 1412, and involve DMRS generation as disclosed elsewhere herein. At 1416, FIG. 14 illustrates multiplexing data and the generated DMRS by UE 1401, and other transmit-side operations such as creating a symbol to be transmitted as in the example transmitter 700 (FIG. 7), may also be performed. UE 1403 may also generate a DMRS at 1412 in the same way as UE 1401, as discussed in the context of the "Find DMRS" operations referenced in FIGS. 11 to 13, for example. A sidelink transmission from UE 1401 to UE 1403 is shown at 1418, and represents one example of how a DMRS may be communicated in a wireless communication network. In this example, communicating the DMRS involves transmitting the DMRS by UE 1401 to UE 1403 and receiving the DMRS by UE 1403 from UE 1401. At 1420, FIG. 14 illustrates UE 1403 performing channel estimation using the DMRS, and decoding data based on the results of the channel estimation.

Figure 15:
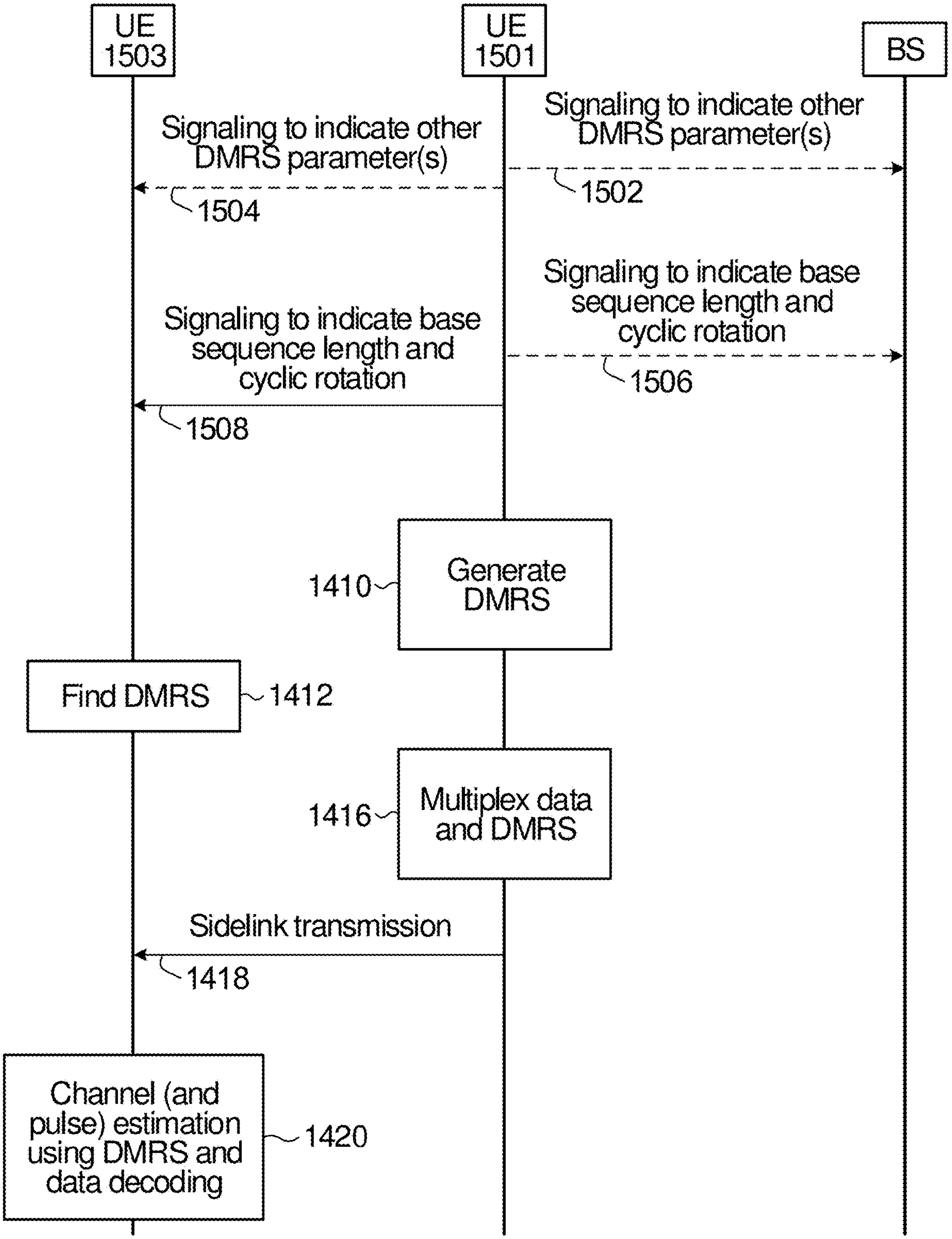
FIG. 15 is a signal flow diagram for sidelink communications according to another embodiment.

In another embodiment for sidelink communications, a transmitter UE such as UE 1401 configures one or more parameters for DMRS transmission and sends the parameter(s) to a receiving UE such as UE 1403, via sidelink control information (SCI) or PC5 (sidelink RRC). FIG. 15 is a signal flow diagram for sidelink communications according to another embodiment, which involves communicating signaling between UE 1401 and UE 1403.

The example in FIG. 15 involves communicating signaling that indicates information associated with a length of a base sequence and a length of a cyclic rotation (at 1508 and optionally at 1506), and possibly communicating signaling at 1502 and/or 1504 that is indicative of information associated with one or more other DMRS parameters. At 1504, 1508, communicating signaling involves transmitting signaling by UE 1501 to UE 1503 and receiving the signaling by UE 1503 from UE 1501. Sidelink communications may involve a transmitting UE (UE 1501 in FIG. 15) selecting or otherwise obtaining base sequence length and length of a cyclic rotation, and possibly one or more other DMRS parameters, and transmitting signaling to a receiving UE (UE 1503 in FIG. 15). The receiving UE (UE 1503) may then receive the signaling and generate the same DMRS sequence as the transmitting UE (UE 1501) for channel estimation, as described at least above with reference to FIG. 14.

Embodiments that involve communicating signaling between UEs as shown by way of example in FIG. 15 may or may not also involve communicating signaling between a BS and a UE. Optional features are shown in FIG. 15 at 1502, 1506. For sidelink communications, DMRS-related operations may remain transparent to the BS, and the BS need not be informed of DMRS parameters or communicate such parameters to UE 1501 at 1502, 1506.

FIGS. 11 to 15 are illustrative of various embodiments. More generally, a method consistent with the present disclosure may involve communicating signaling between a first communication device and a second communication device in a wireless communication network. From the perspective of one of these communication devices, for example, such a method performed by a first (or second) communication device involves communicating signaling with a second (or first) communication device. The signaling indicates information associated with a length of a base sequence and a length of a cyclic rotation in some embodiments.

Communicating signaling may involve transmitting the signaling, receiving the signaling, or both. Similarly, communicating a DMRS may involve transmitting the DMRS, receiving the DMRS, or both. For example, FIGS. 11 to 15 illustrate embodiments in which communicating signaling involves the following, any one or more of which may be provided or supported by different types of communication devices such as UEs or base stations:

- receiving, by a UE, signaling from a BS or another UE, as shown by way of example at 1102, 1104, 1202, 1302, 1304, 1402, 1404, 1406, 1408, 1502, 1504, 1506, 1508;
- receiving, by a BS, signaling from a UE, as shown by way of example at 1202, 1204, 1502, 1506;
- transmitting, by a UE, signaling to a BS and/or to another UE, as shown by way of example at 1202, 1204, 1502, 1504, 1506, 1508;
- transmitting, by a BS, signaling to one or more UEs, as shown by way of example at 1102, 1104, 1202, 1302, 1304, 1402, 1404, 1406, 1408, 1502, 1506.

These examples illustrate that communicating signaling may involve transmitting the signaling by any of various types of first communication device such as a UE or a base station or other network device, to any of various types of second communication device such as a UE or a base station or other network device. Communicating signaling may also or instead involve receiving the signaling at any of various types of first communication device such as a UE or a base station or other network device, from any of various types of second communication device such as a UE or a base station or other network device.

A method may also involve communicating, by a first communication device or a second communication device for example, a DMRS in a wireless communication network. The DMRS comprises a DMRS sequence of a target length, and the DMRS sequence comprising the base sequence cyclically rotated by the length of the cyclic rotation.

Similar to communicating signaling, communicating a DMRS may involve transmitting the DMRS by any of various types of communication device such as a UE or a base station or other network device, to any of various types of communication device such as a UE or a base station or other network device. Communicating a DMRS may also or instead involve receiving the DMRS at any of various types of communication device such as a UE or a base station or other network device, from any of various types of communication device such as a UE or a base station or other network device. Examples of communicating a DMRS, including transmitting and receiving examples, are shown in FIGS. 11 to 15 at 1114, 1312, 1418.

A receiver or intended receiver (or receiving device) of a DMRS may transmit or receive signaling before a DMRS is received. In FIG. 11, for example, the BS is the intended receiver of the DMRS and may transmit signaling at 1104, and optionally at 1102, before receiving the DMRS at 1114. In FIG. 12, the BS is the intended receiver of the DMRS and may receive signaling at 1204, and optionally transmit and/or receive signaling at 1202, before receiving the DMRS at 1114. In FIG. 13, the UE is the intended receiver of the DMRS and may receive signaling at 1304, and optionally at 1302, before receiving the DMRS at 1312. In FIGS. 14 and 15, UE 1403 or UE 1503 is the intended receiver of a DMRS and may receive signaling at 1408 and optionally at 1404 (from the BS) or at 1508 and optionally at 1504 (from UE 1401) before receiving a DMRS at 1418.

Similarly, a transmitter or intended transmitter (or transmitting device) of a DMRS may transmit or receive signaling before a DMRS is transmitted. In FIG. 11, for example, the UE is the transmitter of the DMRS and may receive signaling at 1104 and optionally at 1102 before transmitting the DMRS at 1114. The UE is also the transmitter of the DMRS in FIG. 12, but may transmit signaling at 1204 and optionally transmit and/or receive signaling at 1202 before transmitting the DMRS at 1114. In FIG. 13, the BS is the transmitter of the DMRS and may transmit signaling at 1304 and optionally at 1302 before transmitting the DMRS at 1312. In FIGS. 14 and 15, UE 1401 or UE 1501 is the transmitter of a DMRS and may receive signaling at 1406 and optionally 1402, 1502, 1506 (from the BS), or transmit signaling at 1508 and optionally at 1504 (to the UE 1503) and optionally at 1502, 1506 (to the BS) before transmitting a DMRS at 1418.

In some embodiments, signaling and a DMRS (possibly multiplexed or otherwise combined with data) are communicated between a transmitter and an intended receiver of the DMRS, as in FIGS. 11 to 13 and between UE 1501 and UE 1503 in FIG. 15. Thus, in the context of communicating signaling between a first communication device and a second communication device, in such embodiments communicating a DMRS involves communicating the DMRS between the first communication device and the second communication device.

Signaling and a DMRS need not necessarily be communicated between the same devices. Consider FIG. 14 as an example. Signaling is communicated between the BS and UE 1401 at 1406 and between the BS and UE 1403 at 1408, but the DMRS is communicated between UE 1401 and UE 1403 at 1418. This is illustrative of embodiments in which signaling and a DMRS are not communicated between the same devices. In the context of communicating signaling by a first communication device with a second communication device, in such embodiments communicating a DMRS may involve communicating the DMRS by the first communication device (or the second communication device) and a third communication device in the wireless communication network.

These are all illustrative of examples of communicating signaling and communicating a DMRS.

In some embodiments, the base sequence is or includes a ZC sequence, but other types of sequence are possible, and examples are provided elsewhere herein.

With M denoting the length of the base sequence, the base sequence may be expressed as r(m), $\forall m \in \{0, 1, \ldots M-1\}$, and with $L_u$ denoting the length of the cyclic rotation, the DMRS sequence comprises a base sequence cyclically rotated by $L_u$ and may be expressed as $$\overline{r}_u(m) = r((m - L_u)\mathrm{mod}\, M),\ \forall\, m \in \{0, 1, \ldots M-1\}.$$

The target length of the DMRS sequence may also be communicated between first and second communication devices in some embodiments. From the perspective of one communication device, the target length may be communicated by the first (or second) communication device to the second (or first) communication device. For example, existing signaling at 1102 in FIG. 11 may specify or otherwise indicate a target length of a DMRS sequence. Target length is an example of a parameter that may instead be communicated implicitly. Signaling that indicates a value or other information associated with target length is a form of explicit communication of target length. In other embodiments, target length can be inferred from physical resource block (PRB) size in new radio (NR), and this illustrates implicit signaling of target length. Other types of explicit or implicit signaling may be used in communicating target length and/or other parameters.

Target length of a DMRS sequence may be equal to or greater than the length of the base sequence. In the case of a target length that exceeds the length of the base sequence, the DMRS sequence may be or include the base sequence cyclically extended to the target length. With the target length denoted as $N_u$, the DMRS sequence may be or include the above example base sequence cyclically extended to $N_u$ and may be expressed as $\tilde{r}_u(n)=\tilde{r}_u((n)\mathrm{mod}\ M)$, $\forall n \in \{0, 1, \ldots, N_u-1\}$.

In some embodiments, communicating the DMRS involves communicating a precoded DMRS sequence to which precoding is applied. Example precoders disclosed elsewhere herein include $\phi_u(n)=1\ \forall n$ and $$\phi_u(n) = \begin{cases} 1, & n \text{ is odd} \\ -1, & n \text{ is even} \end{cases}.$$

In an embodiment, the precoding applied to the base sequence involves the precoder $\phi_u(n)=1\ \forall n$ and the DMRS sequence transmitted by another communication device is precoded using $$\phi_u(n) = \begin{cases} 1, & n \text{ is odd} \\ -1, & n \text{ is even} \end{cases}.$$

In another embodiment, precoding applied to the base sequence involves the precoder $$\phi_u(n) = \begin{cases} 1, & n \text{ is odd} \\ -1, & n \text{ is even} \end{cases}$$

and the DMRS sequence transmitted by another communication device is precoded using $\phi_u(n)=1\ \forall n$. More generally, different transmitting devices, such as different UEs, may use different precoding or different precoders.

Pulse shaping may be applied in some embodiments, and accordingly a DMRS sequence may be or include a pulse-shaped DMRS sequence to which pulse shaping is applied. An example of a pulse-shaped DMRS sequence is $v_u(n)=f_u(n)x_u(n)$, where $f_u$ represents pulse shaping coefficients, and $x_u(n)$ is a precoded DMRS sequence. This example also illustrates that pulse shaping and precoding may be applied. More generally, any one or more of precoding, subcarrier mapping, converting from frequency domain to time domain, and cyclic prefix insertion may be provided or supported at a DMRS transmitter, and any one or more of counterpart or inverse operations including cyclic prefix removal, converting from time domain to frequency domain, subcarrier demapping, and decoding may be provided or supported at a DMRS receiver.

These method examples are illustrative and non-limiting embodiments, and other embodiments may include additional or different features disclosed herein.

For example, FIGS. 11 to 15 and subsequent examples above are primarily in the context of one communication device, such as one UE, generating and transmitting a DMRS. However, cyclic rotation, and possibly cyclic extension, of a base sequence as disclosed herein may be particularly useful in multi-UE environments or for other applications in which multiple communication devices generate and transmit DMRSs, as shown by way of example in FIGS. 6, 9, and 10. It should therefore be appreciated that features disclosed herein may be provided or supported by multiple communication devices. With reference to FIGS. 11 to 15, for example, multiple UEs and/or BSs may generate and transmit DMRSs. A UE or BS may also or instead receive DMRSs from multiple other communication devices. Signaling to indicate a base sequence length, and the same or different lengths of cyclic rotations and/or target DMRS sequence lengths, may be transmitted by or received by multiple communication devices, such as multiple UEs, that are to transmit DMRSs. Similarly, signaling to indicate a base sequence length, and the same or different lengths of cyclic rotations and/or target DMRS sequence lengths, for multiple communication devices that are to transmit DMRSs, may be transmitted by or received by a communication device, such as a BS or other network device, that may receive DMRSs from the multiple communication devices.

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

An apparatus may include a processor and a non-transitory computer readable storage medium, coupled to the processor, storing programming for execution by the processor. In FIG. 3, for example, the processors 210, 260, 276 may each be or include one or more processors, and each memory 208, 258, 278 is an example of a non-transitory computer readable storage medium, in an ED 110 and a TRP 170, 172. A non-transitory computer readable storage medium need not necessarily be provided only in combination with a processor, and may be provided separately in a computer program product, for example.

As an illustrative example, programming stored in or on a non-transitory computer readable storage medium may include instructions to, or to cause a processor to, communicate signaling between a first communication device and a second communication device in a wireless communication network. The signaling may be communicated by the first (or second) communication device with the second (or first) communication device. The signaling indicates information associated with a length of a base sequence and a length of a cyclic rotation. The programming may include instructions to, or to cause the processor to, communicate a DMRS in the wireless communication network. The DMRS may be communicated in the wireless communication network by the first (or second) communication device. The DMRS comprises a DMRS sequence of a target length, and the DMRS sequence comprises the base sequence cyclically rotated by the length of the cyclic rotation.

Embodiments related to apparatus or non-transitory computer readable storage media for UE or network device operations may include any one or more of the following features, for example, which are also discussed elsewhere herein:

- the base sequence is or includes a ZC sequence;
- with M denoting the length of the base sequence r(m), $\forall m \in \{0, 1, \ldots M-1\}$, and with $L_u$ denoting the length of the cyclic rotation, the DMRS sequence comprises the base sequence cyclically rotated by $L_u$: $\tilde{r}_u(m)=r((m-L_u) \bmod M)$, $\forall m \in \{0, 1, \ldots M-1\}$;
- the target length of the DMRS sequence is further communicated, by the first communication device with the second communication device, for example;
- the target length is equal to the length of the base sequence;
- the target length exceeds the length of the base sequence, and the DMRS sequence is or includes the base sequence cyclically extended to the target length;
- with the target length denoted $N_u$, the DMRS sequence is or includes the base sequence cyclically extended to $N_u$, and may be expressed as $\tilde{r}_u(n)=\tilde{r}_u((n) \bmod M)$, $\forall n \in \{0, 1, \ldots, N_u-1\}$;
- the programming includes instructions to, or to cause a processor to, communicate the DMRS by communicating a precoded DMRS sequence to which precoding is applied;
- the precoding involves a precoder $\phi_u(n)=1\ \forall n$, and in an embodiment a DMRS sequence transmitted by another communication device is precoded using a different precoder, such as $$\phi_u(n) = \begin{cases} 1, & n \text{ is odd} \\ -1, & n \text{ is even} \end{cases};$$

- the precoding involves a precoder $$\phi_u(n) = \begin{cases} 1, & n \text{ is odd} \\ -1, & n \text{ is even} \end{cases},$$

and in an embodiment a DMRS sequence transmitted by another communication device is precoded using a different precoder, such as $\phi_u(n)=1\ \forall n$;

- the DMRS sequence is or includes a pulse-shaped DMRS sequence to which pulse shaping is applied;
- the DMRS sequence is or includes the pulse-shaped DMRS sequence $v_u(n)=f_u(n)x_u(n)$, where $f_u$ represents pulse shaping coefficients, and $x_u(n)$ is a precoded DMRS sequence;
- the programming includes instructions to, or to cause a processor to, communicate the signaling by transmitting the signaling from the first communication device to the second communication device;
- the programming includes instructions to, or to cause a processor to, communicate the signaling by receiving the signaling at the first communication device from the second communication device;
- the programming includes instructions to, or to cause a processor to, communicate the DMRS by communicating the DMRS with the second communication device;
- the programming includes instructions to, or to cause a processor to, communicate the DMRS by communicating the DMRS with a third communication device in the wireless communication network;
- the programming includes instructions to, or to cause a processor to, communicate the DMRS by transmitting the DMRS;
- the programming includes instructions to, or to cause a processor to, communicate the DMRS by receiving the DMRS for channel estimation.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Features disclosed herein in the context of method embodiments, for example, may also or instead be implemented in apparatus or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

Illustrative embodiments disclosed herein relate primarily to DMRSs. The same or similar embodiments may also or instead apply to other types of reference signals for channel estimation. Channel state information reference signal (CSI-RS) is another type of reference signal, for example.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method performed by a first communication device in a wireless communication network, the method comprising:
- communicating signaling with a second communication device in the wireless communication network, the signaling indicating information associated with a length of a base sequence and a length of a cyclic rotation; and
- communicating a demodulation reference signal (DMRS) in the wireless communication network, the DMRS comprising a DMRS sequence of a target length, and the DMRS sequence comprising the base sequence cyclically rotated by the length of the cyclic rotation.

2. The method of claim 1, wherein the target length of the DMRS sequence is further communicated with the second communication device.

3. The method of claim 1, wherein the target length exceeds the length of the base sequence, and the DMRS sequence comprises the base sequence cyclically extended to the target length.

4. The method of claim 1, wherein communicating the DMRS comprises communicating a precoded DMRS sequence.

5. The method of claim 1, wherein communicating the signaling comprises transmitting the signaling from the first communication device to the second communication device.

6. The method of claim 1, wherein communicating the signaling comprises receiving the signaling at the first communication device from the second communication device.

7. The method of claim 1, wherein communicating the DMRS comprises communicating the DMRS with the second communication device.

8. The method of claim 1, wherein communicating the DMRS comprises communicating the DMRS with a third communication device in the wireless communication network.

9. The method of claim 1, wherein communicating the DMRS comprises transmitting the DMRS.

10. The method of claim 1, wherein communicating the DMRS comprises receiving the DMRS and using the DMRS for channel estimation.

11. An apparatus comprising:
- at least one processor; and
- a non-transitory computer readable storage medium, coupled to the at least one processor, storing programming that is executable by the at least one processor, the programming including instructions to:
  - cause a first communication device to communicate, with a second communication device in a wireless communication network, signaling that indicates information associated with a length of a base sequence and a length of a cyclic rotation; and
  - cause the first communication device to communicate a demodulation reference signal (DMRS) in the wireless communication network, the DMRS comprising a DMRS sequence of a target length, and the DMRS sequence comprising the base sequence cyclically rotated by the length of the cyclic rotation.

12. The apparatus of claim 11, wherein the programming includes instructions to cause the first communication device to communicate the target length of the DMRS sequence with the second communication device.

13. The apparatus of claim 11, wherein the target length exceeds the length of the base sequence, and the DMRS sequence comprises the base sequence cyclically extended to the target length.

14. The apparatus of claim 11, wherein the programming includes instructions to cause the first communication device to communicate the DMRS by communicating a precoded DMRS sequence.

15. The apparatus of claim 11, wherein the programming includes instructions to cause the first communication device to communicate the signaling by transmitting the signaling to the second communication device.

16. The apparatus of claim 11, wherein the programming includes instructions to cause the first communication device to communicate the signaling by receiving the signaling from the second communication device.

17. The apparatus of claim 11, wherein the programming includes instructions to cause the first communication device to communicate the DMRS by communicating the DMRS with the second communication device.

18. The apparatus of claim 11, wherein the programming includes instructions to cause the first communication device to communicate the DMRS by communicating the DMRS with a third communication device in the wireless communication network.

19. The apparatus of claim 11, wherein the programming includes instructions to cause the first communication device to communicate the DMRS by transmitting the DMRS.

20. The apparatus of claim 11, wherein the programming includes instructions to cause the first communication device to communicate the DMRS by receiving the DMRS and using the DMRS for channel estimation.

* * * * *